T. A. JEBB.
Churn.
No. 32,697.
Patented July 2, 1861.
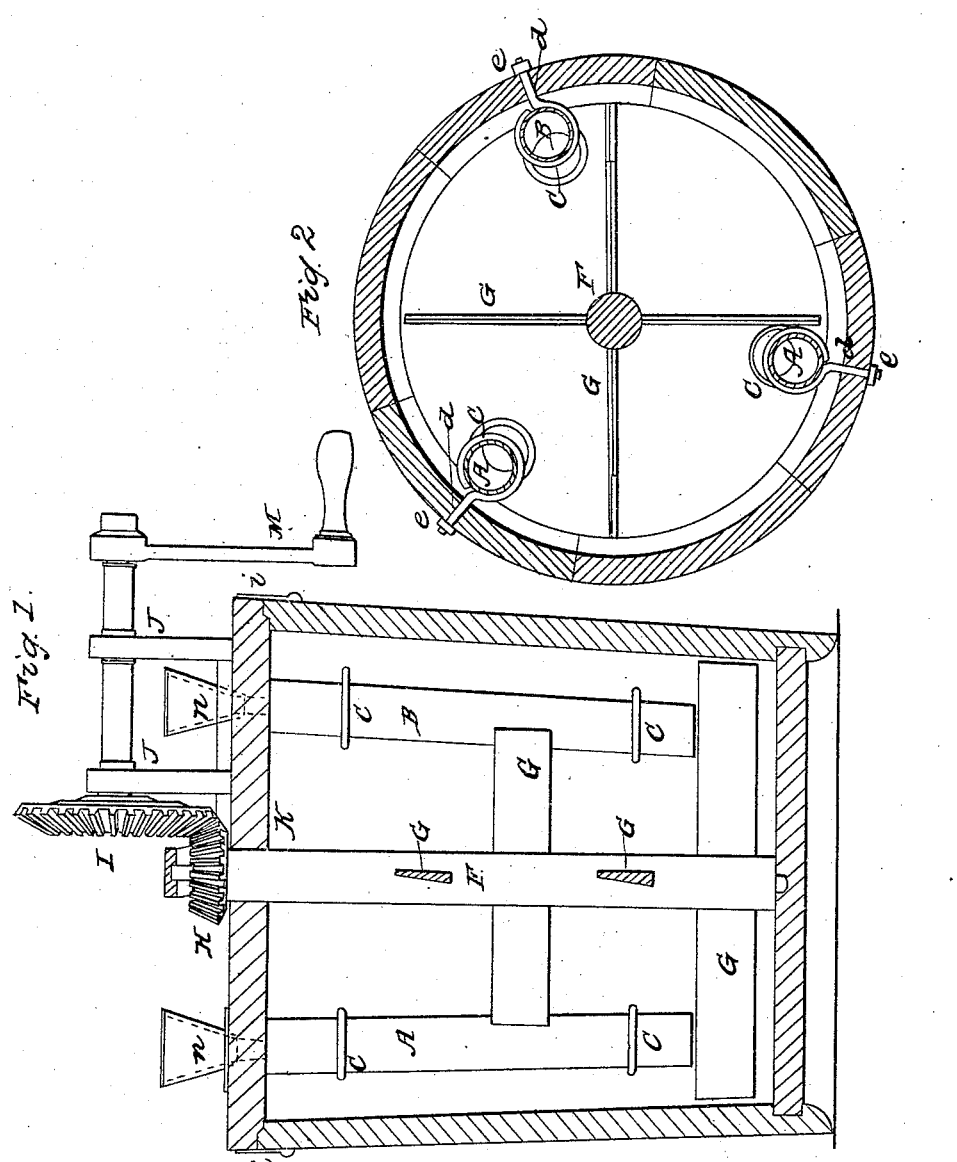
Witnesses
W. H. Forbush
F. L. Baldwin
Inventor
T. A. Jebb

UNITED STATES PATENT OFFICE.

THOMAS A. JEBB, OF BUFFALO, NEW YORK.

CHURN.

Specification of Letters Patent No. 32,697, dated July 2, 1861.

*To all whom it may concern:*

Be it known that I, THOMAS A. JEBB, of the city of Buffalo, county of Erie, and State of New York, have invented certain new and useful Improvements in Churns; and I do hereby declare that the following is a full, clear, and exact description thereof, reference being had to the accompanying drawings, and letters of reference marked thereon, in which—

Figure I is a vertical section and Fig. II a cross section of my improved churn.

Letters of like name and kind refer to like parts in each of the figures.

The nature of this invention relates to the application and use of three tubes (A, A,) and (B) so arranged within the churn as to serve the threefold purpose of, 1st, breaking and dividing the body of cream, as it is set in motion by the dash blades, 2d, graduating the temperature of the cream by the use of warm or cold water in the tubes (A, A,) and 3d, ventilating, by causing a current of air to pass down the tube (B,) into the midst of the cream.

The tubes A, A, and (B) are placed within the body of the churn, equidistant from each other, and at a slight inclination from the perpendicular, and so as to leave a space of half, or three quarters of an inch between them and the body of the churn. They are supported by the rings (C,) which have projecting shanks (*d*) passing through the side of the churn, and held firmly by means of the nuts (*e*) upon the outside of the churn.

The tubes A, A, are made water tight and open at the top and closed at the bottom to receive and hold water. In warm weather these tubes may be wholly, or partly filled with cold water, or ice, and in cold weather, warm water may be used, and the required temperature of the milk or cream, may thereby always be obtained. These tubes may be removed at any time, for the purpose of cleaning, or emptying the water from them. The tube (B) is made open at the top and bottom, so as to allow a current of air to pass down through it into the cream, and thus thoroughly ventilate the cream. Each of the tubes also serves the further purpose of separating and dividing the volume of the milk or cream, as it is agitated by the revolving dash blades a part of the cream being forced against, and through between the tubes and the side of the churn, and part being thrown inwardly toward and against the central shaft, thus effectually breaking the globules of butter and insuring a complete and speedy aggregation thereof. One of the tubes, A, for the purpose of cooling or warming the cream to obtain the right temperature would answer a very good purpose, but I prefer to use two in connection with the open tube, B, for ventilating.

F is a vertical shaft to which the dash blades are connected.

G, G, G, are the dash blades, passing through the shaft at right angles thereto, and projecting upon each side. The length of the lower dash blade is nearly equal to the inner diameter of the churn tub at the bottom, and its ends revolve under the lower ends of the tubes A, A, and B—the effect of which is to drive away the cream from the lower ends of the tubes, and cause a strong suction of air through the air tube, B, into the cream. And in order that this effect may be produced in the most thorough manner, the air tube is made straight, and placed nearly vertical in the tub, so that the dash blade will revolve in close proximity to, and across the lower open end of the tube. The other two dash blades are much shorter, and placed higher on the shaft so that they will revolve in the space between the tubes.

H is a bevel pinion on the upper end of the shaft, E, gearing with the bevel wheel I, supported in the gear frame J. The gear frame is secured to the cover K, which cover is held to the churn tub by the hooks, *l*. M winch handle by which motion is given to the dash blades through the gearing as described. *n, n, n,* are tunnels, connected to the cover K and placed over and opening into the tubes A, A, and B, so that water may be poured into the tubes, A, without removing the cover, and so that air may pass freely into the tube, B.

I claim—

The described arrangement of the water tubes A, A, air tube B, and dash blades G, G, G within the churn tub, so that a space may be left between the said tubes and the sides of the churn tub, and so that the lower dash blade shall revolve under the lower ends of said tubes, while the other dash blades shall revolve in the space between said tubes as set forth.

T. A. JEBB.

Witnesses:
W. H. FORBUSH,
F. L. BALDWIN.